United States Patent
Ogale et al.

(10) Patent No.: US 11,201,853 B2
(45) Date of Patent: Dec. 14, 2021

(54) DNS CACHE PROTECTION

(71) Applicant: VMWARE, INC., Palo Alto, CA (US)

(72) Inventors: Nakul Ogale, Pune (IN); Nilesh Awate, Pune (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/352,901

(22) Filed: Mar. 14, 2019

(65) Prior Publication Data

US 2020/0228495 A1 Jul. 16, 2020

(30) Foreign Application Priority Data

Jan. 10, 2019 (IN) .............................. 201941001150

(51) Int. Cl.
*H04L 29/12* (2006.01)
*H04L 29/08* (2006.01)
(Continued)

(52) U.S. Cl.
CPC ........ *H04L 61/6009* (2013.01); *H04L 41/046* (2013.01); *H04L 41/0631* (2013.01);
(Continued)

(58) Field of Classification Search
CPC ..... H04L 61/10; H04L 61/30; H04L 61/1511; H04L 61/2592; H04L 61/6009; H04L 61/6013; H04L 63/00; H04L 63/029; H04L 63/101; H04L 63/0245; H04L 63/1408; H04L 63/1425; H04L 63/1441; H04L 63/1466; H04L 63/1483; H04L 61/2514; H04L 67/1097; H04L 67/2842; H04L 41/046; H04L 41/0631; H04L 43/16; H04L 45/20; H04L 41/0609; H04L 29/06;
(Continued)

(56) References Cited

U.S. PATENT DOCUMENTS 6,067,620 A 5/2000 Holden et al.
7,134,012 B2 11/2006 Doyle et al.
(Continued)

OTHER PUBLICATIONS

L. Yuan, K. Kant, P. Mohapatra and C. Chuah, "DoX: A Peer-to-Peer Antidote for DNS Cache Poisoning Attacks," 2006 IEEE International Conference on Communications, Istanbul, 2006, pp. 2345-2350, doi: 10.1109/ICC.2006.255120. (Year: 2006).*
(Continued)

*Primary Examiner* — James N Fiorillo
(74) *Attorney, Agent, or Firm* — Adeli LLP

(57) ABSTRACT

Some embodiments provide a method for detecting that a domain name service (DNS) cache on a data compute node (DCN) has been attacked. The method, during a first operational phase of an agent executing on the DCN, builds a DNS cache that stores entries that include (i) network address to domain name mappings and (ii) policies for the entries received from a centralized service. During a second operational phase of the agent, the method detects that an entry of the DNS cache has been modified by a DNS response such that the modified entry violates the policy for the entry. Based on the detection, the method sends an alert to the centralized service. The centralized service performs additional analysis on the modification to determine whether to allow the DCN to use the modified DNS cache entry.

21 Claims, 8 Drawing Sheets

(51) Int. Cl.
 H04L 12/24 (2006.01)
 H04L 12/733 (2013.01)
 H04L 12/26 (2006.01)
(52) U.S. Cl.
 CPC .............. *H04L 43/16* (2013.01); *H04L 45/20* (2013.01); *H04L 61/1511* (2013.01); *H04L 67/2842* (2013.01)
(58) Field of Classification Search
 CPC ......... H04L 29/08; H04L 29/12; H04L 12/24; H04L 12/26; H04L 12/733; G06F 12/802; G06F 12/0866; G06F 16/9574
 USPC .................................. 709/226, 227, 242, 245
 See application file for complete search history.

(56) References Cited

U.S. PATENT DOCUMENTS

| | | | |
|---|---|---|---|
| 7,490,351 B1 | 2/2009 | Caves et al. | |
| 7,620,733 B1 | 11/2009 | Tzakikario et al. | |
| 8,370,933 B1 | 2/2013 | Buckler | |
| 8,407,471 B1 | 3/2013 | Sobel | |
| 8,621,556 B1* | 12/2013 | Bharali | H04L 63/02 726/1 |
| 8,799,482 B1* | 8/2014 | Stamos | H04L 29/0809 709/227 |
| 8,804,729 B1 | 8/2014 | Melman et al. | |
| 9,300,623 B1 | 3/2016 | Earl et al. | |
| 9,398,045 B2 | 7/2016 | Lee | |
| 10,855,644 B1 | 12/2020 | Vijayvargiya et al. | |
| 2003/0070096 A1 | 4/2003 | Pazi et al. | |
| 2003/0163722 A1 | 8/2003 | Anderson | |
| 2004/0059909 A1 | 3/2004 | Pennec et al. | |
| 2006/0088037 A1 | 4/2006 | Finley et al. | |
| 2006/0209818 A1 | 9/2006 | Purser | |
| 2007/0153738 A1 | 7/2007 | Barker et al. | |
| 2007/0192858 A1 | 8/2007 | Lum | |
| 2007/0248085 A1 | 10/2007 | Volpano | |
| 2007/0261112 A1 | 11/2007 | Todd et al. | |
| 2008/0043761 A1* | 2/2008 | Kumar | H04L 61/1511 370/401 |
| 2008/0195700 A1 | 8/2008 | Jonsson | |
| 2009/0089426 A1 | 4/2009 | Yamasaki et al. | |
| 2010/0107250 A1 | 4/2010 | Li | |
| 2010/0121981 A1* | 5/2010 | Drako | H04L 63/0245 709/245 |
| 2010/0199122 A1* | 8/2010 | Sood | H04L 61/1511 714/4.1 |
| 2011/0035784 A1* | 2/2011 | Jakobsson | H04L 67/02 726/2 |
| 2011/0066807 A1* | 3/2011 | Hay | H04L 63/1441 711/118 |
| 2011/0194563 A1 | 8/2011 | Shen et al. | |
| 2012/0011584 A1 | 1/2012 | Kwan | |
| 2012/0087319 A1* | 4/2012 | Raleigh | H04M 15/44 370/329 |
| 2012/0096166 A1* | 4/2012 | Devarapalli | H04L 67/1002 709/226 |
| 2012/0179801 A1* | 7/2012 | Luna | H04L 61/6009 709/223 |
| 2012/0254996 A1* | 10/2012 | Wilbourn | H04L 61/6009 726/22 |
| 2012/0297478 A1* | 11/2012 | Martin | H04L 63/1483 726/22 |
| 2013/0036307 A1 | 2/2013 | Gagliano et al. | |
| 2013/0103784 A1* | 4/2013 | Lyon | H04L 61/1552 709/217 |
| 2013/0107889 A1 | 5/2013 | Barabash et al. | |
| 2013/0291101 A1* | 10/2013 | Karasaridis | H04L 63/1425 726/22 |
| 2014/0089523 A1* | 3/2014 | Roy | H04L 45/04 709/242 |
| 2014/0195666 A1 | 7/2014 | Dumitriu et al. | |
| 2014/0325651 A1 | 10/2014 | Kim et al. | |
| 2015/0058488 A1* | 2/2015 | Backholm | H04L 47/286 709/226 |
| 2015/0074221 A1* | 3/2015 | Kuparinen | H04L 29/12132 709/214 |
| 2015/0358276 A1* | 12/2015 | Liu | H04L 61/1511 726/1 |
| 2016/0026796 A1* | 1/2016 | Monrose | H04L 63/1441 726/24 |
| 2016/0197898 A1* | 7/2016 | Hozza | H04L 63/1466 713/168 |
| 2016/0212204 A1* | 7/2016 | Huang | H04L 61/6009 |
| 2016/0241509 A1* | 8/2016 | Akcin | H04L 67/10 |
| 2016/0248728 A1* | 8/2016 | Evans | H04L 61/1511 |
| 2016/0255012 A1* | 9/2016 | Mizrachi | H04L 63/101 370/230 |
| 2016/0301655 A1 | 10/2016 | Lim et al. | |
| 2016/0330230 A1 | 11/2016 | Reddy et al. | |
| 2017/0093912 A1 | 3/2017 | Poomalai et al. | |
| 2017/0118250 A1* | 4/2017 | Phillips | H04L 67/02 |
| 2017/0142060 A1* | 5/2017 | Thakar | H04L 61/1511 |
| 2017/0264590 A1* | 9/2017 | Xing | H04L 63/1466 |
| 2017/0272454 A1* | 9/2017 | Seo, II | H04L 1/203 |
| 2017/0310709 A1* | 10/2017 | Foxhoven | H04L 61/1511 |
| 2017/0346855 A1* | 11/2017 | Reddy | H04L 63/104 |
| 2017/0374017 A1* | 12/2017 | Gautam | H04L 67/2804 |
| 2018/0027012 A1 | 1/2018 | Srinivasan et al. | |
| 2018/0034827 A1* | 2/2018 | Kaliski, Jr. | H04L 63/123 |
| 2018/0219833 A1 | 8/2018 | Reddy | |
| 2018/0343122 A1 | 11/2018 | Spacek et al. | |
| 2019/0081958 A1* | 3/2019 | Lee | H04L 63/0209 |
| 2019/0190948 A1 | 6/2019 | Xie et al. | |
| 2019/0238504 A1* | 8/2019 | Gupta | H04L 61/1511 |
| 2019/0306166 A1* | 10/2019 | Konda | H04L 63/0428 |
| 2020/0167281 A1* | 5/2020 | Flores | G06F 12/0871 |
| 2020/0213265 A1* | 7/2020 | Deshpande | H04L 61/1511 |
| 2021/0084004 A1 | 3/2021 | Vijayvargiya et al. | |

OTHER PUBLICATIONS

J. Trostle, B. Van Besien and A. Pujari, "Protecting against DNS cache poisoning attacks," 2010 6th IEEE Workshop on Secure Network Protocols, Kyoto, 2010, pp. 25-30, doi: 10.1109/NPSEC.2010.5634454. (Year: 2010).*

X. Yu, X. Chen and F. Xu, "Recovering and Protecting against DNS Cache Poisoning Attacks," 2011 International Conference of Information Technology, Computer Engineering and Management Sciences, Nanjing, Jiangsu, 2011, pp. 120-123, doi: 10.1109/ICM.2011.266. (Year: 2011).*

Olzak T. Dns cache poisoning: Definition and prevention. Mar. 2, 2006). http://www. infosecwriters. com. Mar. 2006. (Year: 2006).*

L. Yuan, K. Kant, P. Mohapatra and C. Chuah, "DoX: A Peer-to-Peer Antidote for DNS Cache Poisoning Attacks," 2006 IEEE International Conference on Communications, Istanbul, 2006, pp. 2345-2350, doi: 10.1109/ICC.2006.255120. (Year: 2006) (Year: 2006).*

J. Trostle, B. Van Besien and A. Pujari, "Protecting against DNS cache poisoning attacks," 2010 6th IEEE Workshop on Secure Network Protocols, Kyoto, 2010, pp. 25-30, doi: 10.1109/NPSEC.2010.5634454. (Year: 2010) (Year: 2010).*

X. Yu, X. Chen and F. Xu, "Recovering and Protecting against DNS Cache Poisoning Attacks," 2011 International Conference of Information Technology, Computer Engineering and Management Sciences, Nanjing, Jiangsu, 2011, pp. 120-123, doi: 10.1109/ICM.2011.266. (Year: 2011) (Year: 2011).*

Olzak T. Dns cache poisoning: Definition and prevention. Mar. 2, 2006). http://www. infosecwriters. com. Mar. 2006. (Year: 2005) (Year: 2005).*

Author Unknown, "Securing Windows Guest Operating Systems with Virtualization-based Security," VMware Docs, May 31, 2019, 2 pages, VMware, Inc.

Author Unknown, "Virtualization-based Security (VBS)", Oct. 4, 2017, 4 pages, Microsoft Corporation.

(56) References Cited

OTHER PUBLICATIONS

Schnackenburg, Paul, "A Look Azure Confidential Computing," Redmond Magazine, Feb. 5, 2019, 8 pages, 1105 Media, Inc.

\* cited by examiner

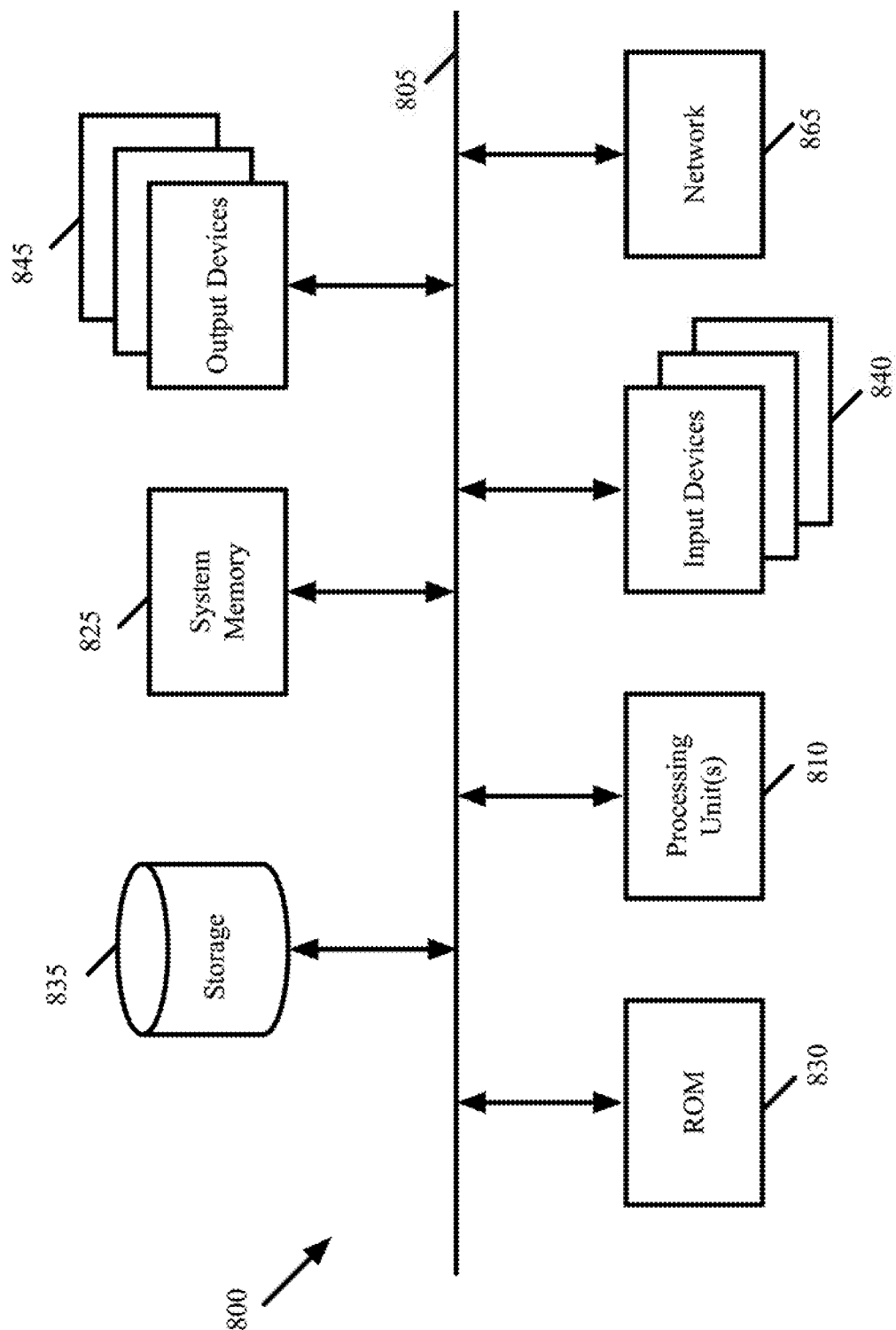

DNS CACHE PROTECTION

RELATED APPLICATIONS

Benefit is claimed under 35 U.S.C. 119(a)-(d) to Foreign Application Serial No. 201941001150 filed in India entitled "DNS CACHE PROTECTION", on Jan. 10, 2019, by VMware, Inc., which is herein incorporated in its entirety by reference for all purposes.

BACKGROUND

The Internet and many local networks operate by sending data in discrete data packets. These networks determine where to send the data packets based on numerical network addresses (e.g., IP addresses). These network addresses are comprised of long strings of numbers not easily memorized or easily communicated accurately by humans. Also, there may be many numerical addresses for a given network location (e.g., multiple IP addresses for a single web site) and these network addresses are subject to change and reassignment. For these reasons, the Internet and many local networks use a domain name service (DNS) to map between domain names and standardized numerical network addresses. Because the network addresses are subject to change, a permanent mapping table between a network address and a given domain name is not possible under general circumstances. Therefore, a DNS server will update the mapping table entries as needed by computers, data compute nodes (DCNs), etc. on the network. However, these updates present an opportunity for bad actors to compromise the security of computers, DCNs, etc. on a network by replacing the mapping of 1) a domain name to a legitimate network address associated with the domain name with 2) a mapping of the domain name to a false network address controlled by the bad actor. This would allow the bad actor to take various malicious actions such as "man in the middle" attacks or other methods of stealing passwords, user names, and/or other data valuable to the bad actor, planting viruses and other malicious programs (malware) etc.

BRIEF SUMMARY

Some embodiments of the invention provide a method that protects a domain name service (DNS) cache of a data compute node (DCN) from a DNS that has been compromised by a hostile entity. In some embodiments, an agent executing on the DCN (e.g., a virtual machine (VM), container, etc.) uses a DNS cache with entries that each (i) map a domain name to a network address and (ii) include a policy for the entry that indicates conditions under which the policy has been violated. When the agent detects that a cache entry has been modified in such a way as to violate the policy, the agent notifies a centralized detection service of the violation (e.g., by sending an alert). The centralized detection service can then perform additional analysis and take an action (e.g., automatically suspend/quarantine the DCN, notify an administrator, etc.).

In some embodiments, the agent executing on the DCN includes two operational phases: a learning phase and a detection phase. During the learning phase, the agent builds the DNS cache by listening for DNS response messages that map domain names to network addresses. At the end of this learning phase the agent sends the cache entries to a centralized service, and receives back from the service policies for each of the entries. These policies, as mentioned, specify conditions under which a modification to the corresponding DNS entries (e.g., a change in the network address to which a domain name is mapped) will violate the policies.

During the detection phase, the agent monitors modifications of entries in the DNS cache to detect if an entry has been modified by a DNS response (e.g., a response to a DNS query from the DCN to a data center DNS server) such that the modified entry violates the policy for the entry, as set in the learning phase. When the agent detects that a modification violates its policy, the agent sends an alert to the centralized service. The centralized service performs additional analysis on the modification to determine whether to allow the DCN to use the modified DNS cache entry, whether to notify an administrator, etc.

In different embodiments, a modified DNS cache entry may violate its policy in various different ways. For instance, if the network address with which a domain name is associated is modified, this could violate a policy that restricts allowable network addresses for the domain name. The policy could set a range of allowable addresses, only allow private network addresses etc. In the latter example, if a modified DNS entry for the domain name associates the domain name with a public network address, the policy would be violated and the agent would send an alert to the centralized service. A range of network addresses might be used when contacting a domain name outside the private network, but with a consistent pattern of network addresses identified during the learning phase (e.g., all network addresses legitimately associated with example.com are IP addresses that start with 192.168).

In addition, the DNS cache entries also include a time to live (TTL) value in some embodiments. The policies could include maximum TTL values for the entries, as a common technique used by malicious entities is to use a larger than usual TTL value for a spoofed DNS entry in order to prevent the DCN from refreshing the DNS entry in a timely manner (and potentially receiving a legitimate network address rather than the network address favored by the malicious entity). In some embodiments, the threshold TTL value is determined during the learning phase for a particular DNS entry. In other embodiments, the threshold value may be set for multiple or even all DNS entries based on TTL values expected from a datacenter DNS.

As noted, the centralized detection service performs additional analysis upon receiving an alert from the agent. As an initial check, in some embodiments the centralized service determines whether a new network address is on a list of blacklisted network addresses (e.g., a global list provided by a trusted global source). If the new network address is a blacklisted address, the centralized service of some embodiments automatically sends a command to prevent the DCN from contacting that address. Additionally, the DCN may merely be quarantined (e.g., not allowed to contact any network address) or suspended entirely (e.g., the centralized service may command that the DCN be shut down).

Some entries may violate policies in more significant ways than others. Accordingly, the agents of some embodiments do not merely provide an alert when a policy is violated by a modified DNS entry, but also provide a specific alarm level so that the centralized service can provide an indicator of how serious the violation is to a network administrator. In some cases, a policy for a domain name may have multiple rules. In such cases, a modified DNS entry may violate multiple rules of a policy. When multiple rules of a policy are violated by a modified DNS entry, the alarm level in some embodiments depends at least partly on how many rules are violated. For instance, an increased TTL value for an entry without a change in network address may be a minor violation, whereas a TTL increase combined with a change from a private network address to a public network address is treated more substantially.

Network circumstances change from time to time. For example, a network address that was not used by a domain name during the learning phase could become a legitimate network address during the detection phase. Therefore, in some embodiments after the sending the alert, the agent is capable of receiving (from the centralized service) an override that identifies the modification to the entry as an exception to the policy for the entry.

In some embodiments, the centralized service provides the alerts to a network administrator (e.g., via a user interface). The network administrator can review the alert and provide instructions to the service as to handle the alert (e.g., quarantine and/or suspend the DCN, ignore/override the alert, etc.). The centralized service then takes this action (e.g., commanding a compute manager of the datacenter to take an action with the DCN, notifying the agent to allow the modification to the DNS entry, etc.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 8 conceptually illustrates an electronic system 800 with which some embodiments of the invention are implemented.

DETAILED DESCRIPTION

Some embodiments of the invention provide a method that protects a domain name service (DNS) cache of a data compute node (DCN) from a DNS that has been compromised by a hostile entity. In some embodiments, an agent executing on the DCN (e.g., a virtual machine (VM), container, etc.) uses a DNS cache with entries that each (i) map a domain name to a network address and (ii) include a policy for the entry that indicates conditions under which the policy has been violated. When the agent detects that a cache entry has been modified in such a way as to violate the policy, the agent notifies a centralized detection service of the violation (e.g., by sending an alert). The centralized detection service can then perform additional analysis and take an action (e.g., automatically suspend/quarantine the DCN, notify an administrator, etc.).

Figure 1:
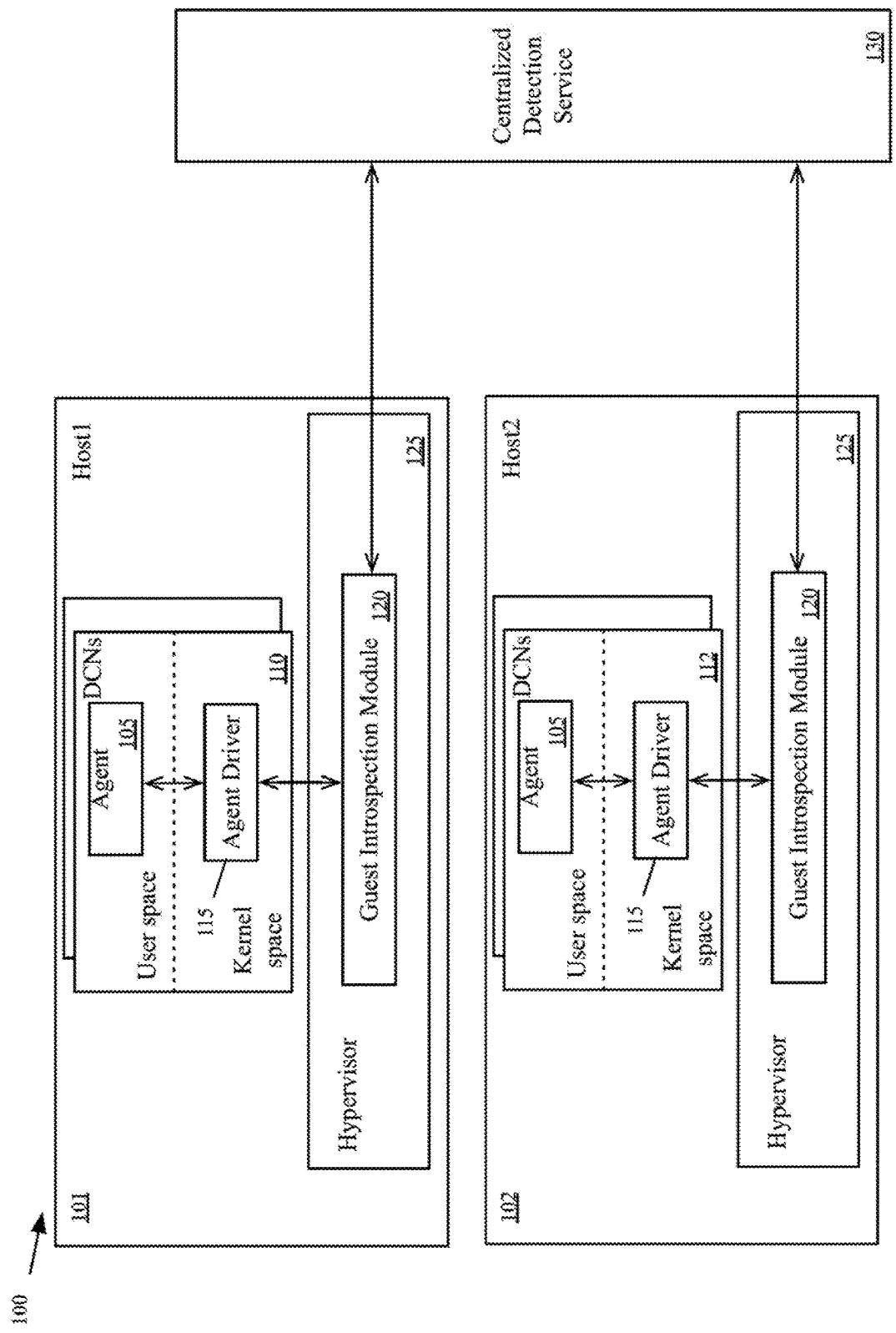
FIG. 1 illustrates a DNS cache poisoning detection system 100 of some embodiments.

FIG. 1 illustrates a DNS cache compromise detection system 100 of some embodiments. The figure includes two host computers 101 and 102, on which various data compute nodes (DCNs) operate, including DCNs 110 and 112. Local agents 105 execute on these data compute nodes (DCNs) 110 and 112 and communicate through agent drivers 115 which in turn communicate with guest introspection modules 120 executing on hypervisors 125 of the hosts 101 and 102. The guest introspection modules 120 communicate with a centralized detection service 130.

The two hosts 101 and 102 of some embodiments are individual physical computers such as servers on a service rack in a datacenter. The DCNs operating on these host computers may belong to the same logical network implemented within the datacenter, or numerous different logical networks. Although only two host computers 101 and 102 are illustrated, the centralized detection service 130 of some embodiments may handle DNS cache compromise detection for numerous DCNs on numerous hosts within the datacenter. This centralized detection service 130 may operate in the same datacenter as the host computers 101 and 102 (e.g., an on-premises enterprise datacenter, a cloud datacenter, etc.) or in a separate location. In addition, in some cases, the centralized detection service 130 handles DNS cache compromise detection for DCNs operating in multiple datacenters.

The local agents 105 of some embodiments are individual programs, modules, or applications that each operate on their respective DCNs. In the illustrated embodiment, the local agents 105 communicate through agent drivers 115. The local agents are shown as operating in a user space while the agent drivers are shown as operating in a kernel space. However, in other embodiments, the agent/agent driver may be a single system operating in one of user space or kernel space, or operating in some other configuration. Similarly, while the guest introspection modules 120 are shown as executing within the hypervisors 125 of the host computers, in some embodiments the agents 105 may use other means to communicate with the centralized detection service 130.

Figure 2:
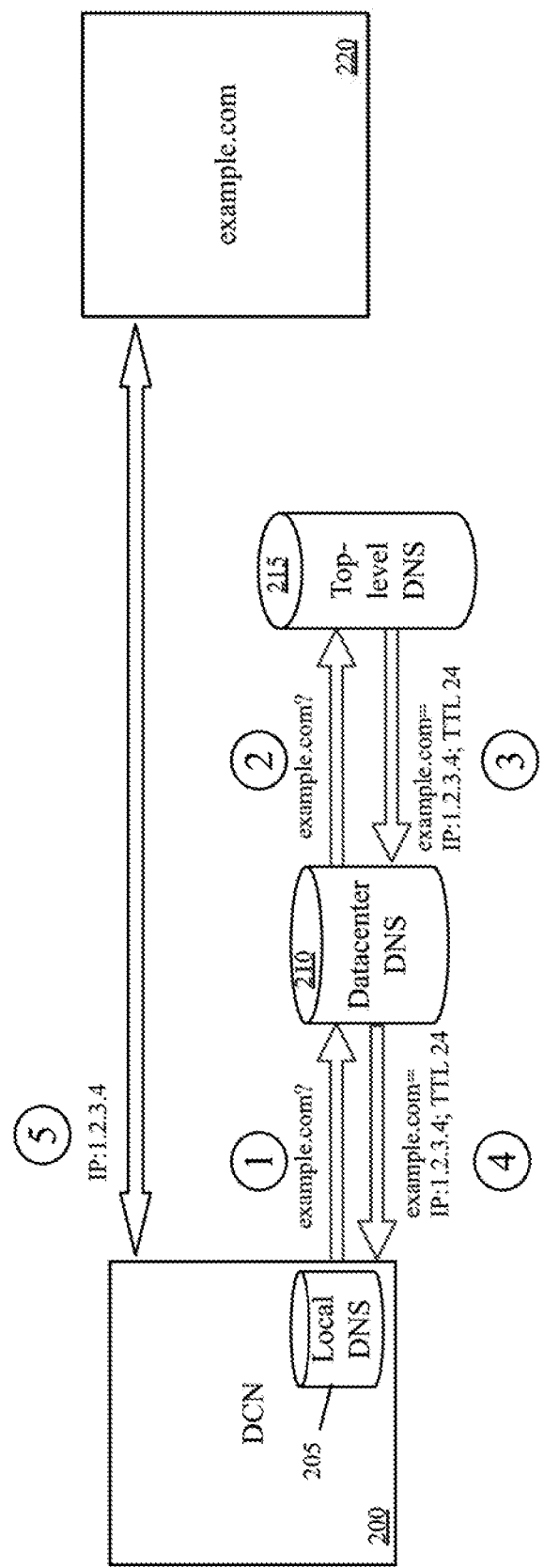
FIG. 2 illustrates normal operations of a DNS caching system.
Figure 3:
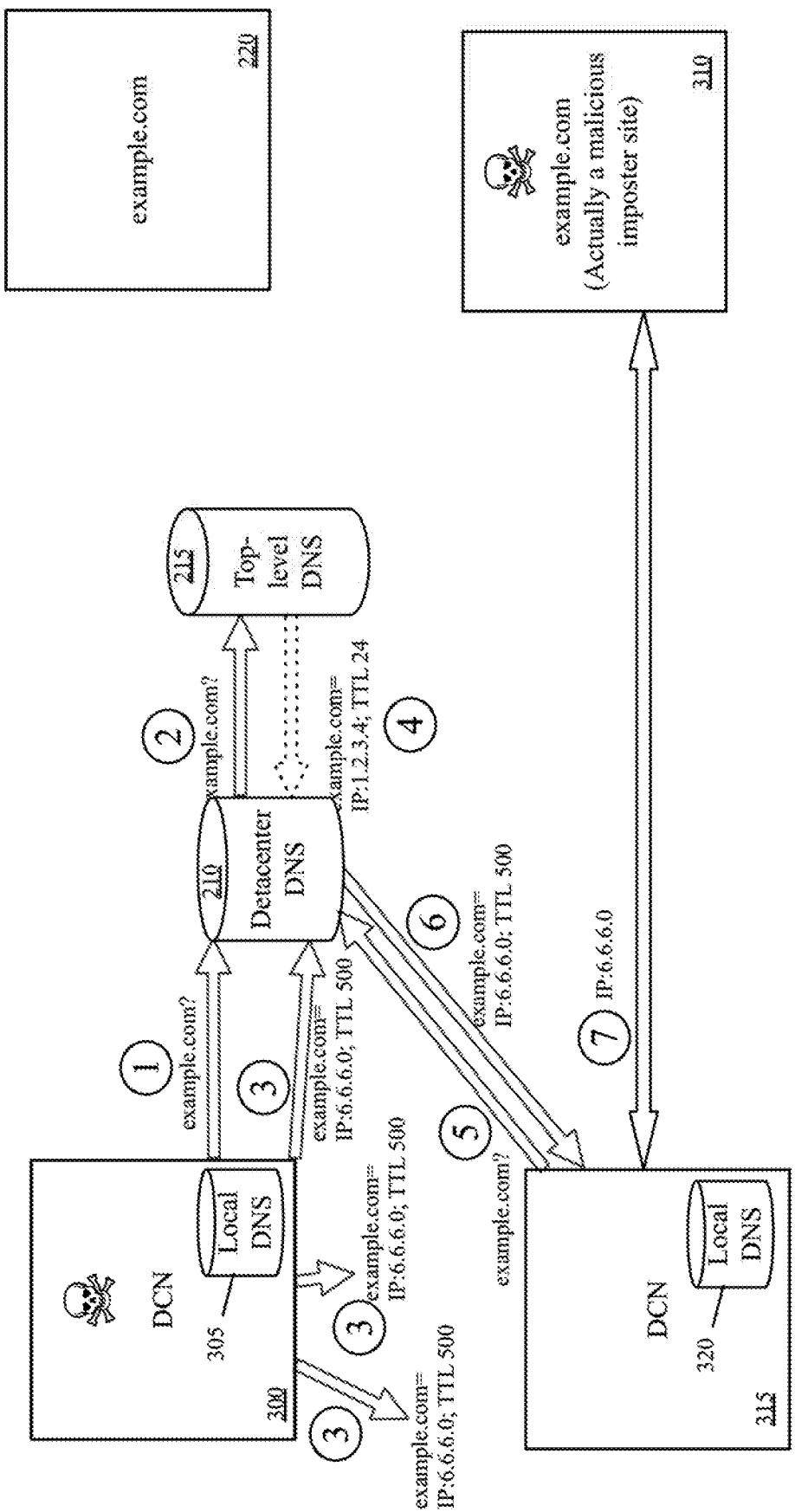
FIG. 3 illustrates corrupted operations of a DNS caching system.
Figure 4:
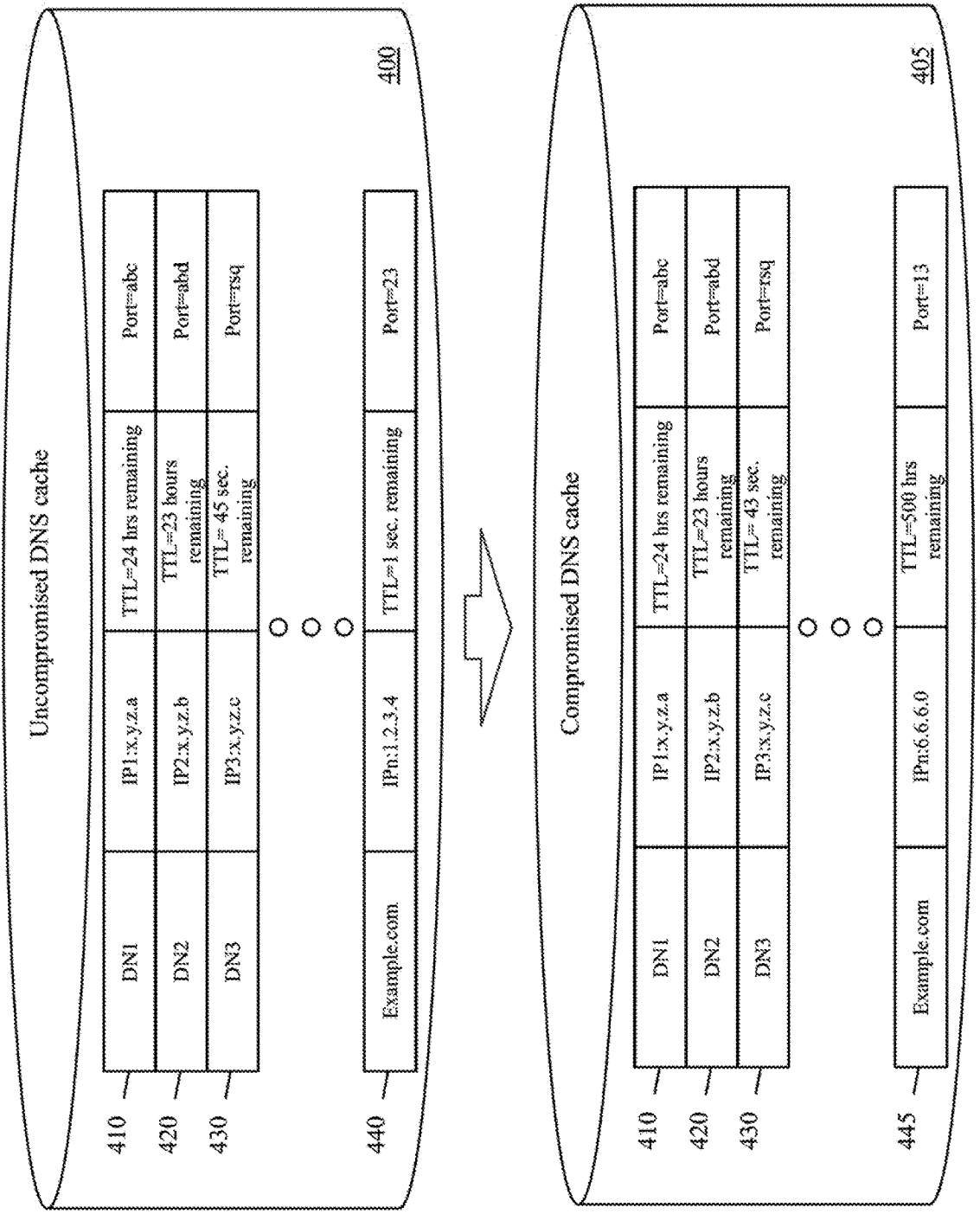
FIG. 4 illustrates the data structure of a DNS cache and an entry changing from a valid entry to a compromised entry.

The operating environment of the invention is a system of DNS servers that provide mapping from domain names, which are generally more recognizable to humans, to sets of numerical network addresses, which are generally more usable by routing devices. FIGS. 2 and 3, which follow, provide illustrations of the intended operation of an example DNS system and the operation of a DNS system that is under attack by bad actors attempting to compromise the system for ends adverse to the interests of the networks legitimate users and administrators. FIG. 4 then shows examples of legitimate DNS entries and the type of corrupted DNS entries that these bad actors are attempting to insert into the DNS system.

FIG. 2 illustrates normal operations of a DNS caching system. The system includes a DCN 200, a local DNS cache 205 (e.g., an operating system DNS cache), a datacenter DNS 210, a top-level DNS 215, and a web-site 220. The normal operation of the DNS caching system begins when the DCN 200 attempts to connect to a website (here, example.com) but there is no DNS entry for that website in the local DNS cache 205. Because there is no entry on the local DNS 205, the DCN 205 sends (in operation 1) a DNS request to the datacenter DNS server 210 to request the entry for the example.com. In the illustrated example, the datacenter DNS 210 does not have an entry for example.com, so the datacenter DNS 210 in turn sends (in operation 2) a DNS request to a top-level DNS 215. The top-level DNS 215 sends (in operation 3) a DNS entry for example.com with a network address (IP address 1.2.3.4) and an indicator of how long that network address should be treated as valid before a lower level DNS should send a request for an updated DNS entry. In the illustrated embodiment, this indicator is called a time to live (TTL) indicator and is set to 24 hours. The datacenter DNS 210 sends (in operation 4) the DNS entry to the DCN 200 for storage in the local DNS cache 205. Once the local DNS has received a DNS entry for example.com, the DCN 200 uses the supplied network address to contact (in operation 5) the correct website 220.

The illustrated example illustrates one possible scenario, in which no DNS server below the top-level DNS 215 includes an entry for example.com. In other cases, any of the lower level DNS caches or servers may already contain an entry for example.com that has not yet expired. If the datacenter DNS server 210 contains such an entry, but the local DNS cache 205 initially does not, then the system skips steps 2 and 3 and the datacenter DNS 210 supplies the stored entry to the local DNS cache 205. If the local DNS cache 205 initially has an entry that has not yet expired for example.com, then the DCN 200 simply uses that entry.

FIG. 3 illustrates operations that compromise such a DNS caching system. In this example, some entities in the system are operating as intended, while other entities have been compromised by bad actors trying to disrupt the legitimate operations of the system. The figure includes a compromised DCN 300 and an initially uncorrupted DCN 315, with respective local DNS caches 305 and 320, as well as an imposter website 310. This figure also includes the datacenter DNS 210, top level DNS 215, and website 220 from FIG. 2.

The corrupted operations begin when the DCN 300, having previously been compromised by a bad actor (e.g., through a virus or other malware or other unauthorized access method) sends (in operation 1) a DNS request for a network address of example.com to the datacenter 210. Unlike the actions shown in FIG. 2, this DNS request is not a genuine search for a valid DNS entry information, but an attempt to get the datacenter DNS server 210 to become vulnerable to a hoax DNS entry for example.com. The datacenter DNS server 210 initially lacks any entry for example.com (e.g., because any previous entry for the website had expired). Therefore the datacenter DNS 210 sends (in operation 2) a DNS request to top-level DNS 215. In this scenario, the top-level DNS 215 has a valid DNS entry for example.com. However, before the top-level DNS 215 can send the valid DNS response to datacenter DNS 210, the compromised DCN 300 sends out (in operation 3) a flood of hoax DNS entries for example.com. Here, the hoax DNS entries have a different network address from the legitimate DNS entry (in this case, IP address 6.6.6.0 instead of IP address 1.2.3.4). Additionally, some bad actors attempt to increase the amount of time for which the system is compromised by using a higher TTL (here, 500 hours instead of 24 hours). These hoax DNS entries are intended to mimic a legitimate DNS response being sent to datacenter DNS 210. Accordingly, by the time the legitimate DNS response is sent (in operation 4) from the top-level DNS 215 to the datacenter DNS 210, the datacenter DNS 210 has already accepted one of the hoax DNS entries.

After the hoax DNS entry is accepted by the datacenter DNS server 210, a later DNS request is sent (in operation 5) from the OS DNS 320 of DCN 315 of the datacenter DNS 210 for a DNS entry for example.com, during the extended TTL of the hoax entry. The datacenter DNS 210, having previously accepted the hoax entry, sends (in operation 6) a copy of that hoax entry to the local DNS 320 of the legitimately operating DCN 315. The initially uncompromised DCN 315 then becomes compromised as any communications intended for the example.com website 220 (IP address 1.2.3.4) instead are sent to malicious imposter website 310. Such a diversion allows all manner of harmful events to occur such as man-in-the-middle attacks or other attacks to steal usernames/passwords, possible infection of the DCN 315 with viruses or other malware, etc.

FIG. 4 illustrates the data structure of a DNS cache of some embodiments and an example of an entry changing from a valid entry to a compromised entry. The figure includes an uncompromised DNS cache 400 and a compromised DNS cache 405. The uncompromised DNS cache 400 includes numerous valid entries 410-440, four of which are shown. Each valid entry 410-440 includes (i) a domain name (represented here as DN1-DN3 and Example.com, respectively), (ii) a network address (e.g., an IP address) associated with that domain name, (iii) a time to live (TTL) value counting down the amount of time for with the DNS entry is considered valid), and (iv) a port number. It should be understood that DNS cache entries may also include other values that are not shown in this figure.

As mentioned above, the network addresses associated with a particular domain name are subject to change, and therefore the DNS entries are presumed valid for a limited time. In the illustrated example, DNS entry 440 is about to expire (1 second remaining). While the entry 440 is valid, the replacement DNS entry 445 in compromised DNS cache 405 that replaces it (e.g., after a compromised DCN corrupts the entry as illustrated in FIG. 3) has a different IP address and a TTL of 500 hours, far larger than the usual starting TTL for that entry of 24 hours.

Figure 5:
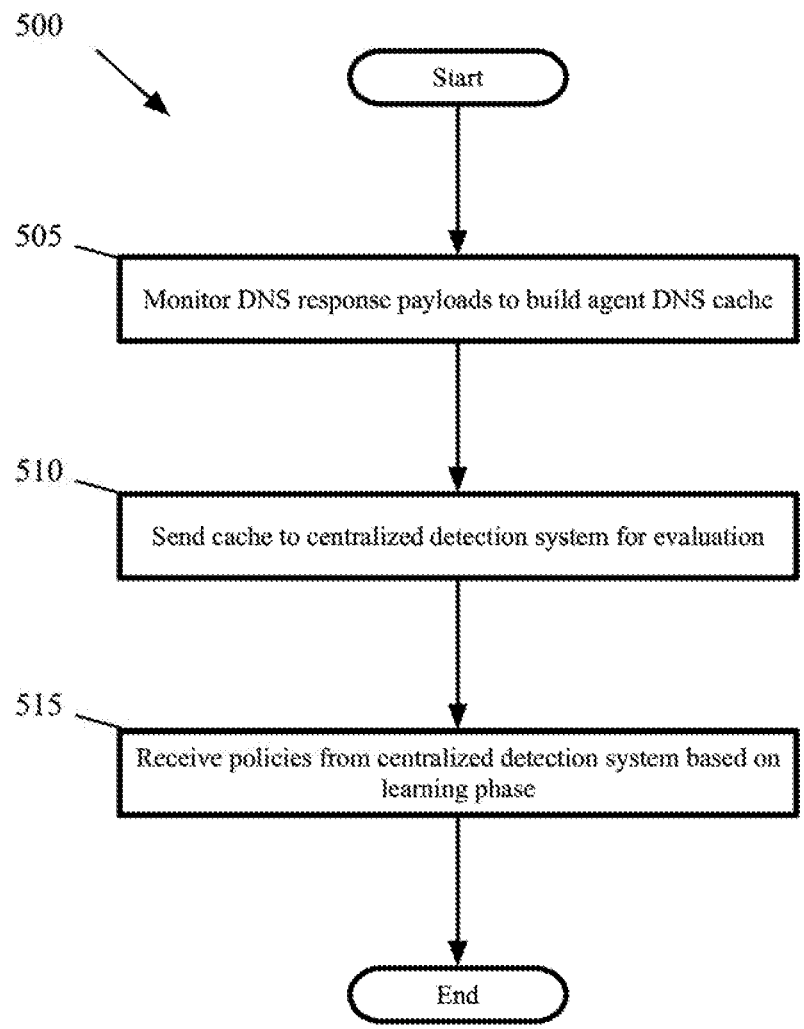
FIG. 5 conceptually illustrates a process 500 of some embodiments for a learning phase used to set policies for identifying attempts to poison DNS caches of a network.
Figure 6:
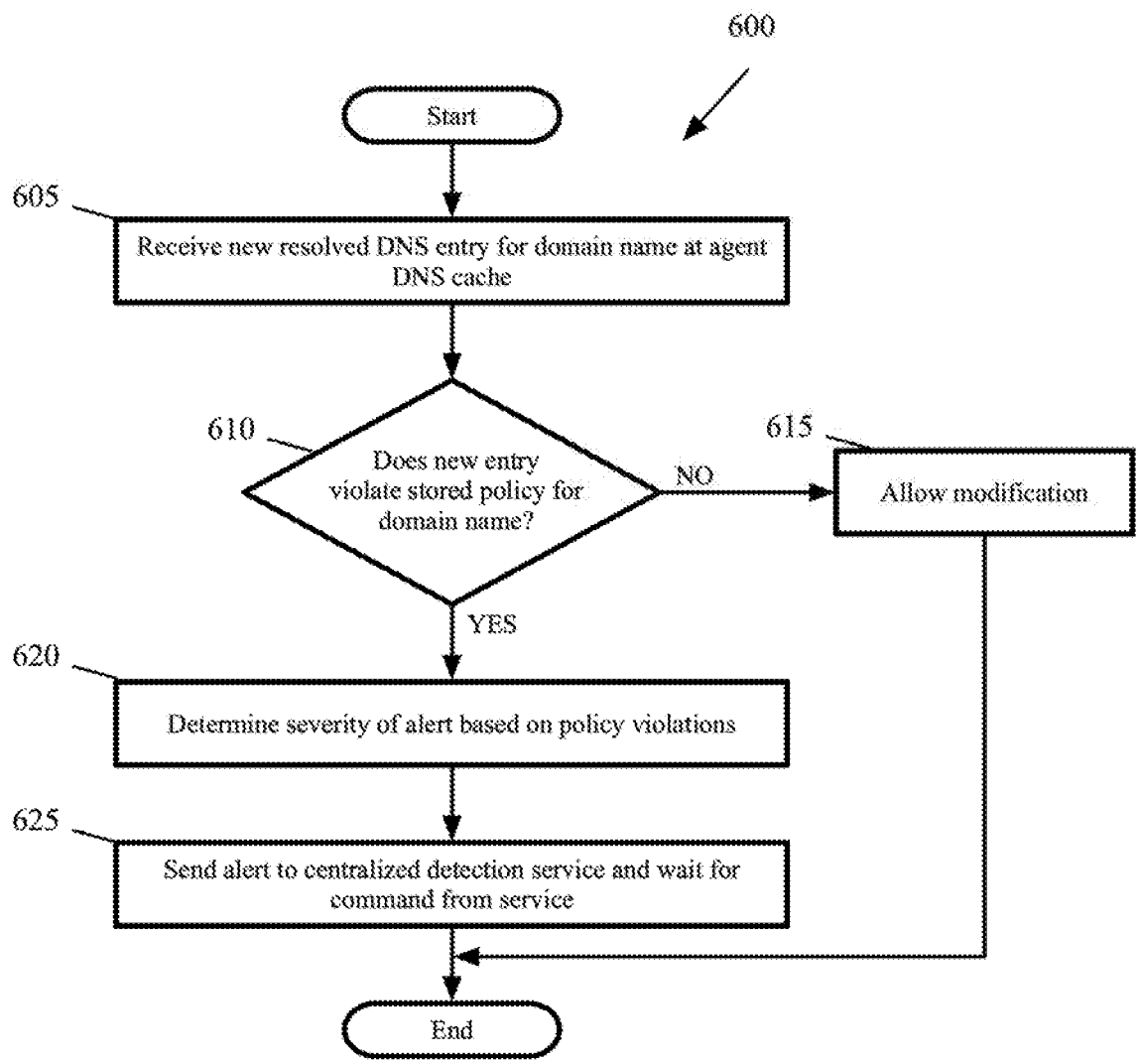
FIG. 6 conceptually illustrates a process 600 of some embodiments for detecting DNS poisoning.
Figure 7:
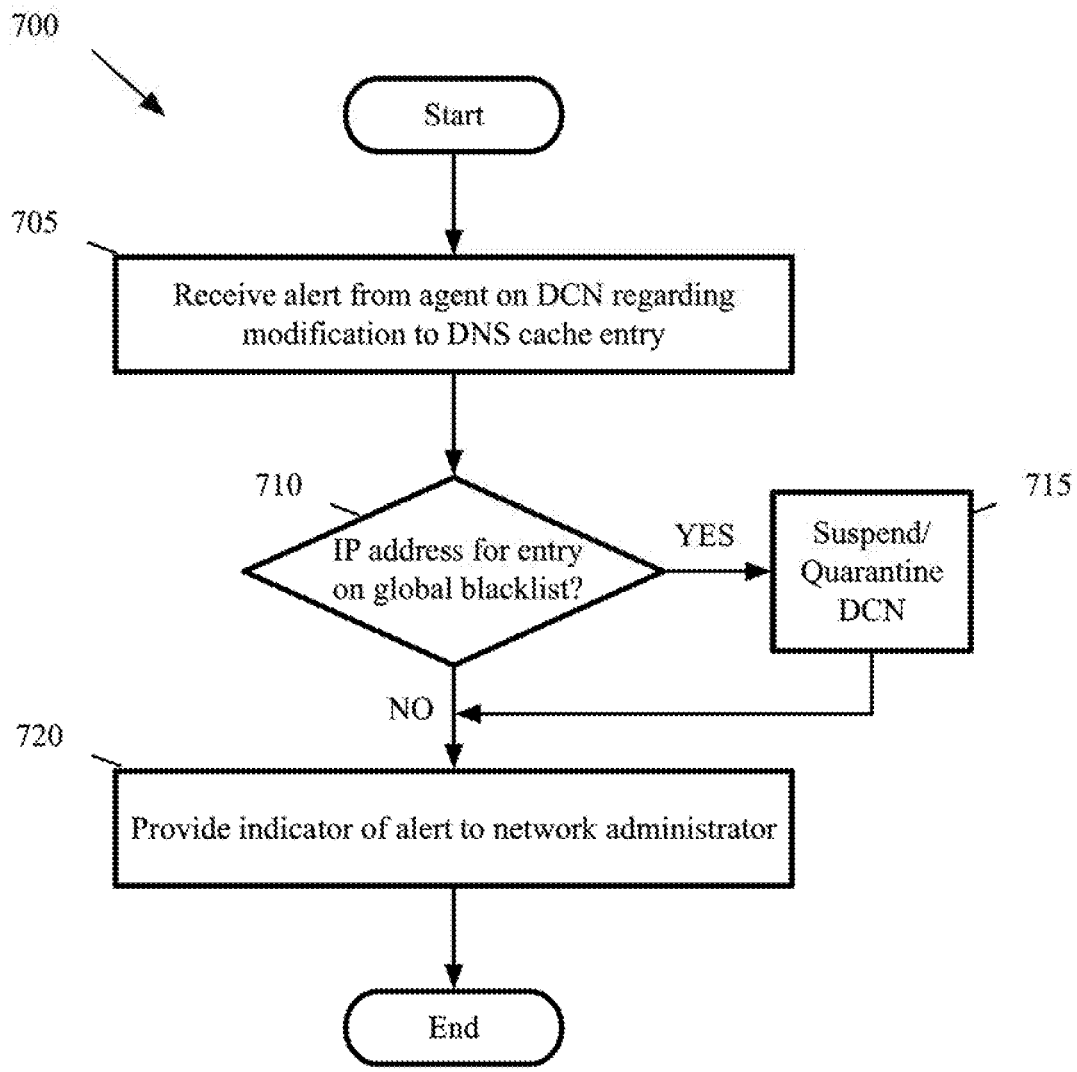
FIG. 7 conceptually illustrates a process 700 of some embodiments for the centralized detection service to process alerts of possible DNS cache poisoning.

The agents operating on the DCNs, as mentioned, monitor the local DNS cache of the DCN for changes, and determine whether those changes violate policies. In some embodiments, the agent executing on the DCN includes two operational phases: a learning phase and a detection phase. During the learning phase, the agent builds the DNS cache by listening for DNS response messages that map domain names to network addresses. At the end of this learning phase the agent sends the cache entries to a centralized service, and receives back from the service policies for each of the entries. These policies specify conditions under which a modification to the corresponding DNS entries (e.g., a change in the network address to which a domain name is mapped) will violate the policies. FIGS. 5 and 6, which follow, respectively illustrate the agent's role in the learning and detection phases. FIG. 7 then illustrates the role of the centralized detection service during detection FIG. 5 conceptually illustrates a process 500 of some embodiments for building policies used to identify attempts to corrupt a DNS caches of a DCN. This process 500 is performed by an agent executing on the DCN in some embodiments during the learning phase of the agent. As shown, the process 500 monitors (at 505) DNS response payloads to build an agent DNS cache. This step is performed during the learning phase while the system is being carefully monitored to ensure that all the DNS response payloads received are legitimate. In some embodiments, the learning phase may be performed before a network system "goes live". That is, the learning phase of the agent is executed before the DCN (and in some cases, the logical or physical network to which the DCN belongs) is fully operational and in some cases before the DCN is exposed to the full Internet. A learning phase in which the system does not connect to the Internet is useful when the DNS payloads will refer to network addresses within a private network rather than to network addresses on the public internet. After building an agent DNS cache, the process 500 sends (at 510) the cache to a centralized detection system for evaluation. In some embodiments, the evaluation at the centralized detection system is performed by system administrators, automated evaluation applications, or some combination of the two. The evaluation by the centralized detection system allows policies to be set at the centralized detection system that apply to common groups of virtual machines, common groups of applications, or other groups of similar systems that benefit from uniform policies.

After the caches are evaluated and policies formulated at the centralized detection system, the process 500 receives (at 515) the policies from the centralized detection system based on the data collected (by the agent) and analyzed (at the centralized detection system). In various embodiments, the policies may specify different types of restrictions on the DNS cache entries. The policies can be specific to a single DNS entry (i.e., for a particular domain name) or general policies for modifications to any DNS entry in the cache. These policies can include various restrictions, such as limiting the network address to which a domain name is mapped to a specific range of addresses, to a particular class of network addresses (e.g., only private addresses), etc. In addition, the restrictions may limit modifications to other aspects of a DNS entry, such as setting a maximum allowed TTL value, limiting the port number of a DNS entry, etc.

During the detection phase, the agent monitors modifications to entries in the local DNS cache to detect if an entry has been modified by a DNS response (e.g., a response to a DNS query from the DCN to a data center DNS server) such that the modified entry violates the policy for the entry, as set in the learning phase. FIG. 6 conceptually illustrates a process 600 of some embodiments for detecting attempts to corrupt a DNS cache. This process 600 is also performed by an agent executing on a DCN to monitor the local DNS cache of the DCN, in some embodiments. In this case, the process 600 is performed during the detection phase of the agent (i.e., after the policies have been set during the learning phase).

As shown, the process 600 begins by receiving (at 605) a new resolved DNS entry for a particular domain name at a local DNS cache monitored by the agent. The new resolved DNS entry of some embodiments includes a network address and a TTL for the DNS entry (e.g., based on the DCN contacting a DNS server to resolve a domain name).

The process 600 then determines (at 610) whether the new DNS entry violates a stored policy for the domain name. The stored policy of some embodiments is set during a learning phase (e.g., as described above by reference to FIG. 5). As mentioned, the policies may specify different types of restrictions on the DNS cache entries. The policies can be specific to a single DNS entry (i.e., for a particular domain name) or general policies for modifications to any DNS entry in the cache. In different embodiments, a modified DNS cache entry may violate its policy in various different ways. For instance, if the network address with which a domain name is associated is modified, this could violate a policy that restricts allowable network addresses for the domain name. The policy could set a range of allowable addresses, only allow private network addresses etc. In the latter example, if a modified DNS entry for the domain name associates the domain name with a public network address, the policy would be violated. A range of network addresses might be used when contacting a domain name outside the private network, but with a consistent pattern of network addresses identified during the learning phase (e.g., all network addresses legitimately associated with example-.com are IP addresses that start with 192.168).

In addition, the policy could include a maximum TTL value for the entry that is violated by the new DNS entry, as a common technique used by malicious entities is to use a larger than usual TTL value for a spoofed DNS entry in order to prevent the DCN from refreshing the DNS entry in a timely manner (and potentially receiving a legitimate network address rather than the network address favored by the malicious entity).

If the new entry does not violate a policy, the process 600 allows (at 615) the modification of the DNS entry in the local DNS cache. As mentioned, this modification may change the network address associated with a particular domain name, change the TTL value for an entry, or add a new entry associated with a domain name that was not previously found in the DNS cache.

If the new entry is determined (at 610) to violate the policy, then the process 600 determines (at 620), based on the policy violation(s) found, a severity (or alarm level) for an alert based on the policy violation(s). Some policy violations may be ranked higher than other policy violations in determining the severity of the alert. For example, in some embodiments, a new DNS entry that replaces a private IP address with a public IP address may be determined to warrant a higher severity of alert than a new DNS entry that replaces a public IP address within an allowed range with a public IP address outside the allowed range. In some embodiments, a single DNS entry may violate multiple policies and the severity of the alert may be increased based on the number of policies violated. For example, a new DNS entry may have a network address outside an allowed range of network addresses and additionally may include a higher TTL value (e.g., 500 hours) than a threshold TTL value (e.g., 24 hours). Such a double policy violation may result in a higher alert severity than either violation would alone in some embodiments. Different embodiments may use different factors to determine the severity of an alert, including using factors specified within the policies.

After determining (at 620) the severity of the alert, the process 600 sends (at 625) the alert to a centralized detection service (e.g., for further analysis) and waits for a command from the service. As mentioned above, when the agent detects that a modification violates its policy, the agent sends an alert to the centralized service. The centralized service performs additional analysis on the modification to determine whether to allow the DCN to use the modified DNS cache entry, whether to notify an administrator, etc.

FIG. 7 conceptually illustrates a process 700 of some embodiments for the centralized detection service to process alerts of possible DNS cache corruption. The process 700 receives (at 705) an alert from an agent on a DCN regarding modification to a DNS cache entry. In some embodiments, the alert may be provided from an agent as described with respect to FIG. 6 (i.e., because the modification violates a previously set policy). The alert of some embodiments provides a network address (e.g., an IP address) of the new/modified DNS entry, as well as the TTL value and any other relevant data). The process 700 then determines (at 710) whether the network address for the new/modified entry is on a blacklist. In some embodiments, this blacklist may be generated by the central detection service in some fashion or may be received from external sources (e.g., online databases of malware/unsafe sites). If the new network address is on the blacklist rather than merely outside of policy, the process 700 automatically suspends or quarantines the DCN that received the DNS entry with the blacklisted address. Quarantining the DCN, in some embodiments, allows the DCN to stay operational but prevents the DCN from sending or receiving some or all network traffic, so as to prevent communication with the presumably malicious website that is on the blacklist. Such suspension/quarantine may be handled in different ways in different embodiments. The centralized detection service may activate a suspension/quarantine by sending commands to a component shown in FIG. 1, such as the agent, the agent driver or the hypervisor, and/or by sending commands to some other component of the host computer and/or DCN. In other embodiments, the centralized detection service contacts a separate network manager (or compute manager) to handle the suspension/quarantine of the DCN.

Whether the alert relates to a DNS entry with a network address on the blacklist or not, the process 700 then provides (at 720) an indicator of the alert to network administrators. The indicator in some embodiments includes one or more of the network address, the policy being violated, the type of group to which the policy applies, whether the policy violating DNS entry includes a TTL that is higher than a threshold value, etc. This allows the network administrator to indicate that the alert can be ignored (and the DNS entry modification allowed), that the DCN should be suspended and/or quarantined, etc.

Network circumstances change from time to time. For example, a network address that was not used by a domain name during the learning phase could become a legitimate network address during the detection phase. Therefore, in some embodiments after the sending the alert, the agent is capable of receiving (from the centralized service) an override that identifies the modification to the entry as an exception to the policy for the entry. In some embodiments, in addition to or instead of individual overrides, additional learning phases may be used to add new policies or replace existing sets of policies.

FIG. 8 conceptually illustrates an electronic system 800 with which some embodiments of the invention are implemented. The electronic system 800 can be used to execute any of the control, virtualization, or operating system applications described above. The electronic system 800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieve instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory is a volatile read-and-write memory, such a random access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the electronic system. The input devices 840 include alphanumeric keyboards and pointing devices (also called "cursor control devices"). The output devices 845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 5, 6, and 7) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for detecting that a domain name service (DNS) cache for a data compute node (DCN) has been corrupted, the DCN executing on a host computer, the method comprising:

during a first learning phase of an agent executing on the host computer, (1) building the DNS cache that stores entries comprising network address to domain name mappings and (2) receiving policies from a centralized service for monitoring the entries in the DNS cache based on analysis of the DNS cache, the centralized service providing policies for monitoring DNS caches for a plurality of DCNs executing on a plurality of host computers, wherein the policies specify restrictions for one or more of the plurality of DNS cache entries;

during a second detection phase of the agent, monitoring the DNS cache to detect that an entry of the DNS cache has been modified by a DNS response such that the modified entry violates a particular defined policy received by the agent from the centralized service;

based on the detection, sending an alert to the centralized service that analyzes modifications to DNS cache entries for a plurality of agents executing on the plurality of host computers, wherein the centralized service performs additional analysis on the modification to determine whether to allow the DCN to use the modified DNS cache entry; and when the centralized service determines to allow the modification, receiving an indication from the centralized service specifying to allow the DCN to use the modified DNS cache entry, wherein when the centralized service determines to not allow the modification, the agent receives a command from the centralized service specifying a remedial action to apply to the DCN.

2. The method of claim 1, wherein the modified entry violates the particular defined policy based on a new network address of the modified entry violating the particular defined policy.

3. The method of claim 2, wherein the additional analysis on the modification performed by the centralized service comprises determining whether the new network address is on a list of blacklisted network addresses.

4. The method of claim 3, wherein, when the network address is on the list of blacklisted network addresses, the remedial action specified by the command from the centralized service is a quarantine of the DCN.

5. The method of claim 3, wherein, when the network address is on the list of blacklisted network addresses, the remedial action specified by the command from the centralized service is a suspension of the DCN.

6. The method of claim 2, wherein the modified entry is an entry for a particular domain name, wherein the particular defined policy comprises a rule requiring that a network address associated with the particular domain name is a private network address and the new network address of the modified entry is a public network address.

7. The method of claim 2, wherein the modified entry is an entry for a particular domain name, wherein the particular defined policy comprises a rule requiring that a network address associated with the particular domain name is within a particular range of network addresses determined during the first learning phase of the agent.

8. The method of claim 1, wherein the alert comprises an alarm level and the centralized service provides an indicator of the alert specifying the alarm level to a network administrator.

9. The method of claim 8, wherein the particular defined policy comprises a plurality of rules, wherein the alarm level is based at least partly on a number of the rules violated by the modified entry.

10. The method of claim 1, wherein the DNS cache entry comprises a time to live (TTL) value, wherein detecting that the modified entry violates the particular defined policy comprises determining that a new TTL value of the modified entry is greater than a threshold TTL value specified by the particular defined policy.

11. The method of claim 10, wherein the threshold TTL value is determined during the first learning phase of the agent.

12. The method of claim 1, wherein receiving the indication from the centralized service specifying to allow the DCN to use the modified cache entry comprises receiving from the centralized service an override that identifies the modification to the entry as an exception to the particular defined policy for the entry.

13. The method of claim 1, wherein the first learning phase is a phase in which allowable network addresses are identified and at least a subset of defined policies are generated based on the identified allowable network addresses.

14. A non-transitory machine readable medium storing an agent program which when executed by at least one processing unit of a host computer detects that a domain name service (DNS) cache for a data compute node (DCN) also executing on the host computer has been attacked, the agent program comprising sets of instructions for:
   during a first learning phase, (1) building the DNS cache that stores entries comprising network address to domain name mappings and (2) receiving policies from a centralized service for monitoring the entries in the DNS cache based on analysis of the DNS cache, the centralized service providing policies for monitoring DNS caches for a plurality of DCNs executing on a plurality of host computers, wherein the policies specify restrictions for one or more of the plurality of DNS cache entries;
   during a second detection phase, monitoring the DNS cache to detect that an entry of the DNS cache has been modified by a DNS response such that the modified entry violates a particular defined policy received by the agent from the centralized service;
   based on the detection, sending an alert to the centralized service that analyzes modifications to DNS cache entries for a plurality of agents executing on the plurality of host computers, wherein the centralized service performs additional analysis on the modification to determine whether to allow the DCN to use the modified DNS cache entry;
   when the centralized service determines to allow the modification, receiving an indication from the centralized service specifying to allow the DCN to use the modified DNS cache entry; and
   when the centralized service determines to not allow the modification, receiving a command from the centralized service specifying a remedial action to apply to the DCN.

15. The non-transitory machine readable medium of claim 14, wherein the modified entry violates the particular defined policy based on a new network address of the modified entry violating the particular defined policy.

16. The non-transitory machine readable medium of claim 15, wherein the modified entry is an entry for a particular domain name, wherein the particular defined policy comprises a rule requiring that a network address associated with the particular domain name is a private network address and the new network address of the modified entry is a public network address.

17. The non-transitory machine readable medium of claim 15, wherein the modified entry is an entry for a particular domain name, wherein the particular defined policy comprises a rule requiring that a network address associated with the particular domain name is within a particular range of network addresses determined during the first learning phase.

18. The non-transitory machine readable medium of claim 14, wherein the DNS cache entry comprises a time to live (TTL) value, wherein the set of instructions for detecting that the modified entry violates the particular defined policy comprises a set of instructions for determining that a new TTL value of the modified entry is greater than a threshold TTL value specified by the particular defined policy.

19. The non-transitory machine readable medium of claim 14, wherein the first learning phase is a phase in which allowable network addresses are identified and at least a subset of defined policies are generated based on the identified allowable network addresses.

20. The method of claim 1, wherein:
   the DCN is a first DCN operating on the host computer;
   a plurality of DCNs execute on the host computer, the plurality of DCNs including the first DCN; and
   agents executing on each of the plurality of DCNs perform the learning and detection phase operations for DNS caches that are stored for each DCN.

21. The method of claim 1 further comprising, during the first learning phase:
   sending the DNS cache to the centralized service for evaluation and formulation of the policies; and
   storing the policies received from the centralized service.

* * * * *